Patented Sept. 20, 1927.

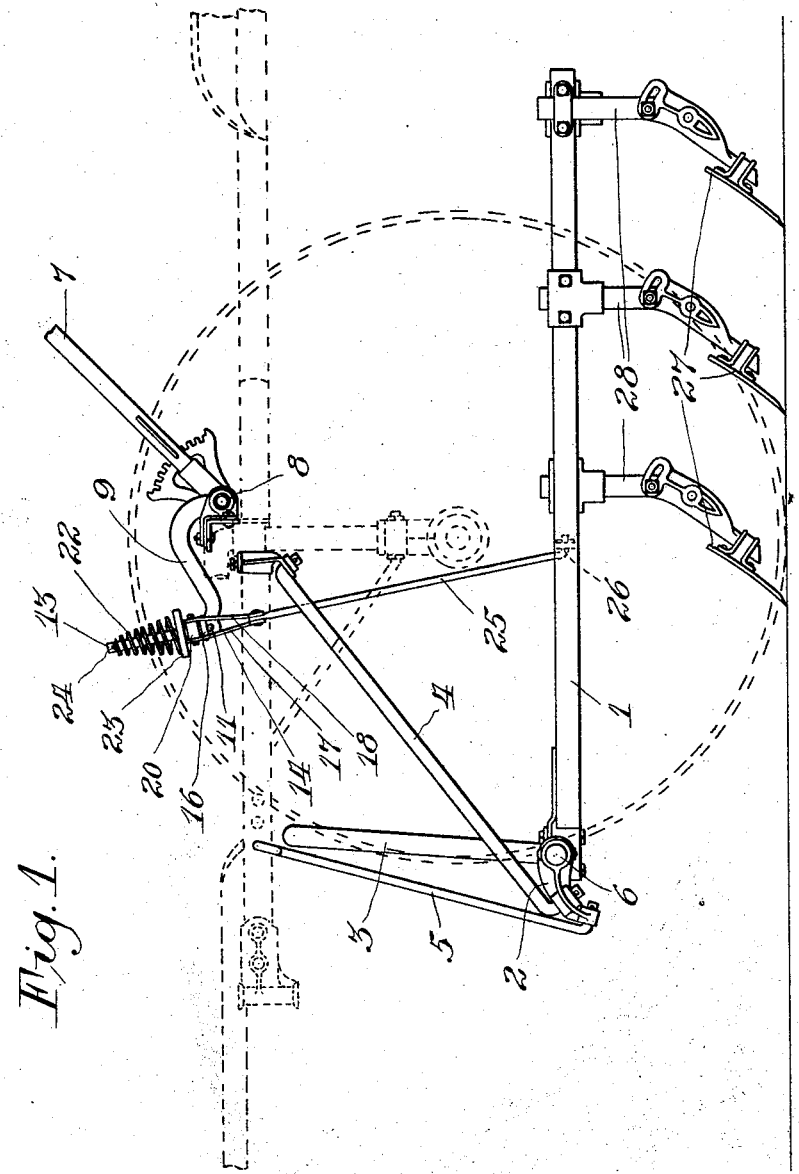

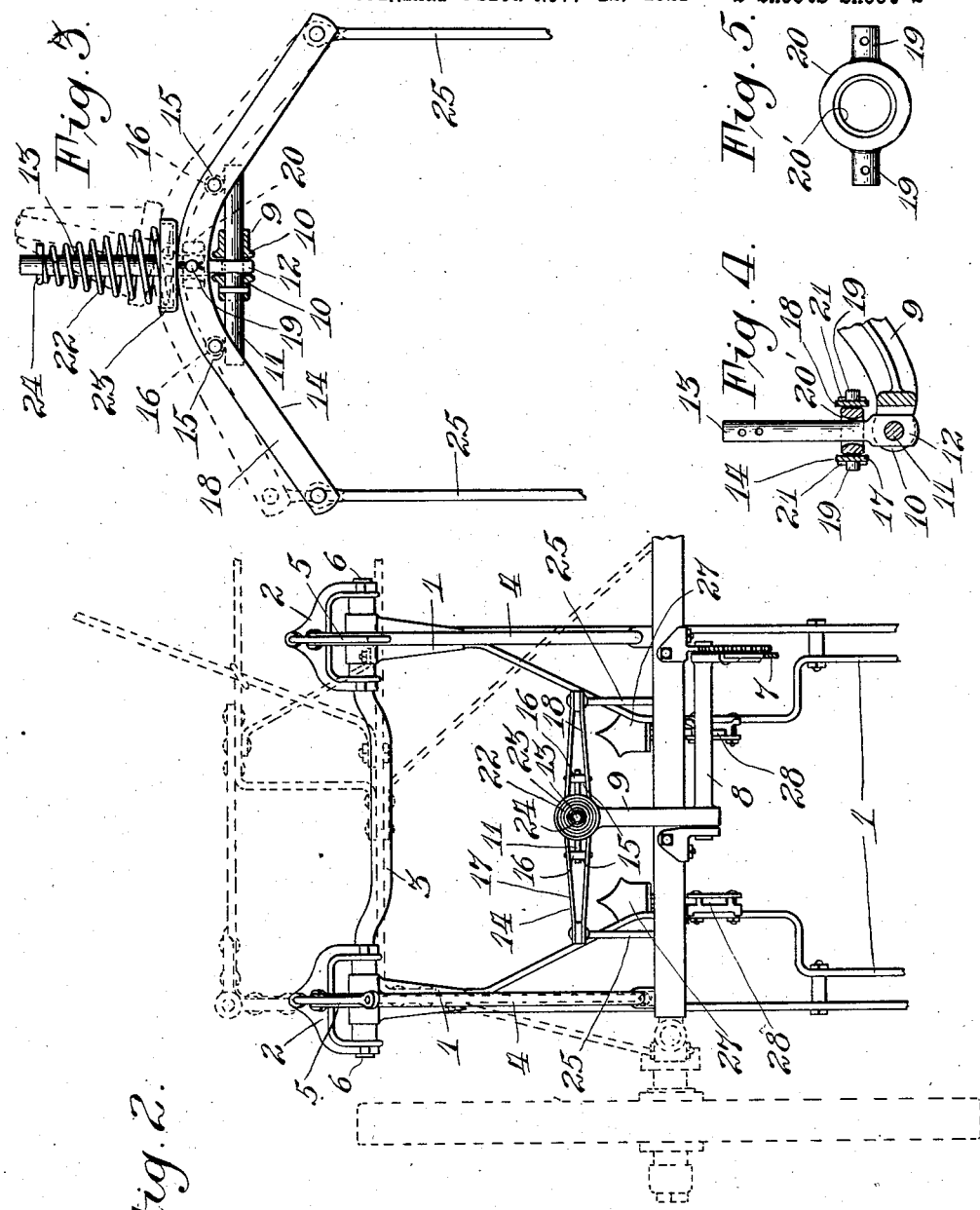

1,643,153

UNITED STATES PATENT OFFICE.

SAMUEL K. DENNIS, OF CHICAGO, ILLINOIS, ASSIGNOR TO INTERNATIONAL HARVESTER COMPANY, OF CHICAGO, ILLINOIS, A CORPORATION OF NEW JERSEY.

ELEVATING AND DEPRESSING MECHANISM FOR CULTIVATORS.

Original application filed November 12, 1921, Serial No. 514,500. Divided and this application filed January 30, 1926. Serial No. 84,828.

The invention disclosed in this application relates to agricultural implements, and has for its object to provide certain improvements in cultivators.

One of such improvements has to do particularly with devices for controlling the gangs of a cultivator.

More particularly the invention is intended to provide an improved elevating and depressing mechanism for the vertically movable beams of a cultivator.

In addition to the features above mentioned, this invention provides such improvements as are hereinafter particularly pointed out.

The illustrative embodiment of the invention herein disclosed is also disclosed in the application bearing Serial No. 514,500, filed November 12, 1921, of which this application is a division.

In the accompanying drawings,—

Fig. 1 is an elevation showing the elevating and depressing mechanism as applied to a known type of cultivator;

Fig. 2 is a plan view of a portion of a cultivator with the elevating and depressing mechanism applied thereto;

Fig. 3 is an elevation of my elevating and depressing mechanism, showing parts thereof in vertical section;

Fig. 4 is a vertical, sectional, detail view showing the relationships of certain of the parts illustrated in Fig. 3; and Fig. 5 is a plan of a trunnioned coupling, which forms a part of the elevating and depressing device herein disclosed.

The illustrative device is shown in conjunction with a cultivator embodying metallic frame members and supporting wheels. These parts are shown in dotted line in the drawing, such disclosure being considered sufficient for the purposes of this application.

Parallel cultivator beams 1 are pivotally supported at their forward ends by means of brackets 2, and a yoke 3 extending through the brackets. These brackets are pendulously supported from the main frame of the cultivator by means of push rods 4, and links 5. The ends 6 of the arch 3 extend through the brackets 2 so as to form journals upon which the cultivator beams 1 are pivotally mounted.

A single lever 7 is shown mounted upon the cultivator frame, and devices are interposed between this lever and two parallel cultivator beams so that those beams may be advantageously elevated and depressed by movement of that lever. The lever 7 is fixedly mounted upon a rock shaft 8 having a crank arm 9 extending forwardly therefrom. The forward end of this crank arm is bifurcated, the bifurcated portions 10 being bored to permit the passage of a pin 11 therethrough. This pin is preferably fixedly secured to the bifurcated portion of the crank arm 9. In the assembly of the illustrative device, the eye 12 of a stem 13 is interposed between the bifurcated ends of the crank arm 9 before passing the pin 11 through those arms. Thus, the stem 13 is pivotally related to the crank arm 9 in a substantially permanent manner.

Upon the pin or post 11 a two-part equalizer bar 14 is supported by means of transverse struts or braces 15. These struts are preferably cylindrical in form and are composed of spacing sleeves 16 interposed between the two parts of the equalizer bar. A rivet is passed through the equalizer bar parts and through the spacing sleeve so as to provide a compact and rigid structure.

The two flat metal sections 17 and 18, which make up the equalizer bar 14, are preferably bowed upwardly and at their highest points they are fitted with holes to receive the trunnions 19 of a perforated coupling, through which the stem 13 passes. The sides of the opening in this coupling element are preferably of convex contour, the convexity being presented toward the center of the stem 13 and the coupling element, as indicated at 20. This particular structure permits of appropriate swiveling action of the stem 13 within the coupling. Fastening devices, such as cotter pins 21, are passed through the trunnions of the coupling exteriorly of the bars 17 and 18, as clearly indicated in Fig. 4.

In order that the controlling mechanism may resiliently press the yoke 14 downwardly a compression coil spring 22 is shown mounted between the upper end of the stem 13 and the yoke 14. This spring is suitably seated within a socket member, or washer, 23, the lower surface of which bears against the bars 17 and 18 of the yoke 14. This spring is confined in position upon the stem by means of a pin 24 passed through the upper end of the stem, as shown.

The extremities of the bars 17 and 18 are connected by means of rivets which pass therethrough and through the eyes of the upper ends of connecting rods 25, each one of these rods being connected to a cultivator beam as indicated at 26, and extending substantially directly upward therefrom to the yoke 14.

Cultivator teeth 27 are shown secured to the cultivator beams 1 by means of standards 28 which are bolted directly to the beams.

The dotted line position of the yoke 14, as indicated in Fig. 3 of the drawings, illustrates a condition of the elevating and depressing mechanism when one of the connected cultivator beams is operating at a different elevation from that at which the other is operating. Such a condition may arise by reason of one of the cultivator beams operating upon higher ground or by reason of the fact that one of the beams has encountered obstructions of a character different from that of the obstructions encountered by the other beam. For instance, if one beam is operating in soil that is easily workable, and the other is operating in hard, or compact soil, the beams may move to different vertical positions, and yet each receive its proportionate share of the compressing action of the single spring 22.

Under some soil conditions the operator may desire to have the cultivator operated normally without spring pressure exerted upon the beams to force the teeth into the earth. Under such operation, both of the struts 15 will be in contact with the post 11, the arrangement then being as indicated in full lines in Fig. 3. If, in this case, the left hand cultivator teeth should strike an obstruction so as to force the left hand beam upwardly, the left hand strut 15 (in Fig. 3) will be elevated out of contact with the adjacent end of the post 11 so that the elevated cultivator beam will receive the full force and effect of the compression spring 22. Under these conditions the spring will act to force the displaced cultivator beam back to normal working position.

While the specific embodiment of my invention has been described by way of example, it is to be understood that variations in the construction are intended to be covered by this application, to an extent measured by the scope of the following claims.

I claim as my invention:

1. Elevating and depressing mechanism for cultivator beams comprising a single crank arm flexibly connected to a plurality of cultivator beams by means of an equalizer bar so as to uniformly distribute the downward pressure upon the beams, and a rockable connection between the crank arm and the bar.

2. An elevating and depressing device for cultivating beams comprising a rock shaft, a single crank arm fixedly mounted upon said rock shaft, an upwardly bowed equalizer bar extending over said crank arm and supported thereby, a rockable connection between the crank arm and the bar, the ends of said equalizer bar being located substantially directly over adjacent cultivator beams, and means for connecting the ends of the equalizer bar with the cultivator beams.

3. A cultivator comprising a wheel supported frame, a rock shaft mounted for oscillation upon the frame, a crank arm extending from said rock shaft, an upwardly bowed equalizer bar extending over the end of said crank arm, the mid portion of the equalizer being substantially directly over the end of the crank arm, devices rockably supporting the equalizer bar on the crank arm, and means connecting each end of the equalizer bar with a cultivator beam located substantially directly below.

4. In a tool adjusting mechanism for cultivators, an equalizer bar having each of its ends connected with a cultivator beam located substantially directly below it, the equalizer bar extending transversely of the cultivator beams, a rock shaft mounted on the cultivator frame, a lever for operating said rock shaft, a crank arm fixed to said rock shaft, and connections between the crank arm and medial portion of the equalizer bar whereby either end of the equalizer bar may move upwardly relative to the crank arm, and an upwardly compressible spring for resisting upward movement of either or both beams.

5. In a cultivator, the combination with a pair of pivoted cultivator beams, of a lever provided with a projecting arm, an upright connected with the end of the arm, a transverse equalizer bar slidably mounted relative to the upright, a compression spring on said upright above said bar, and lifting links connecting the ends of the bar with the cultivator beams.

6. In a cultivator, the combination with a pair of pivoted cultivator beams of a rock shaft, a crank arm fixed to the rock shaft, a lever for operating the rock shaft, an upright on the end of the crank arm, a transverse equalizer bar slidably mounted on said upright, a compression spring on the upright and above said bar, stops on said bar adapted to engage with said lateral projections when the drag bars are elevated, and lifting links connecting the ends of the bar with the cultivator beams.

7. The combination with a pair of pivoted cultivator beams of unitary elevating and depressing means for both beams comprising a crank arm, a transverse equalizer bar movably supported on the end of the crank arm, yielding means on the arm for resisting upward movement of the equalizer bar, and links connecting the ends of said bar with the respective beams.

8. A tillage implement comprising, in combination, a wheel supported frame, cultivator beams pivotally supported by the frame, a lift arm pivotally mounted upon the frame, an equalizer bar supported by the lift arm, a connection between each beam and one end of the equalizer bar, and a two-point support rockably associating the equalizer bar with the lift arm.

9. A tillage implement comprising, in combination, a wheel supported frame, cultivator beams pivotally supported by the frame, a movable lift arm carried by the frame, an equalizer bar supported by the lift arm, a connection between each end of the equalizer bar and a cultivator beam, a transverse member supported by the lift arm, spaced stops carried by the equalizer bar and normally engaging the transverse member to support the beams, and means located between said stops for resiliently resisting upward pivotal movement of said bar about either stop as a center.

10. A tillage implement comprising, in combination, a wheel supported frame, cultivator beams pivotally supported by the frame, a lift arm movably supported by the frame, an equalizer bar supported by the lift arm, a connection between each end of the equalizer bar and a cultivator beam, connections including a two-point rockable support between the equalizer bar and the lift arm for permitting pivotal upward movement of either end of the equalizer bar about either of said points of support.

11. A tillage implement comprising, in combination, a wheel supported frame, cultivator beams pivotally supported by the frame, a lift arm pivotally mounted upon the frame, an equalizer bar rockably supported by the lift arm, a connection between each beam and one end of the equalizer bar, and a two-point lost motion support associating the equalizer bar with the lift arm so that either end of the bar may move upwardly relative to the arm by pivotal movement about one of said points of support.

12. A tillage implement comprising, in combination, a wheel supported frame, cultivator beams pivotally supported by the frame, a movable lift arm carried by the frame, an equalizer bar supported by the lift arm, a connection between each end of the equalizer bar and the cultivator beam, a transverse support connected to the lift arm, spaced stops carried by the equalizer bar and normally engaging the transverse member, and downwardly acting spring means located between said stops for resiliently resisting upward pivotal movement of said bar about either stop as a center.

13. A tillage implement comprising, in combination, a wheel supported frame, cultivator beams pivotally supported by the frame, a lift arm pivotally supported by the frame, an equalizer bar supported by the lift arm, a link connecting each end of the equalizer bar and a cultivator beam; and means including a two-point rockable support for associating the equalizer bar and the lift arm for permitting pivotal upward movement of either end of the equalizer bar about one of said points of support, said means including a transverse rod carried by the lift arm and transversely spaced stops carried by the equalizer bar.

In testimony whereof I affix my signature.

SAMUEL K. DENNIS.